(12) United States Patent
Tal et al.

(10) Patent No.: US 6,400,782 B2
(45) Date of Patent: Jun. 4, 2002

(54) METHOD OF FREQUENCY DOMAIN FILTERING EMPLOYING A REAL TO ANALYTIC TRANSFORM

(75) Inventors: Nir Tal, Haifa; Nir Shapira; Ron Cohen, both of Ramat Hasharon, all of (IL)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/758,536

(22) Filed: Jan. 10, 2001

Related U.S. Application Data

(63) Continuation of application No. 09/146,878, filed on Sep. 3, 1998, now abandoned.

(51) Int. Cl.$^7$ .............................. H04B 1/10; H03K 5/01
(52) U.S. Cl. ...................... 375/350; 370/210; 708/404
(58) Field of Search ................................ 375/229, 230, 375/232, 235, 254, 285, 346, 349, 350; 370/208, 210, 290, 291; 708/403, 404, 405; 379/410, 411

(56) References Cited

U.S. PATENT DOCUMENTS

| | | | |
|---|---|---|---|
| 4,807,173 A | | 2/1989 | Sommen et al. |
| 4,951,269 A | | 8/1990 | Amano et al. |
| 5,270,953 A | | 12/1993 | White |
| 5,285,474 A | | 2/1994 | Chow et al. |
| 5,748,686 A | | 5/1998 | Langberg et al. |
| 6,108,413 A | * | 8/2000 | Capman et al. .............. 379/410 |
| 6,240,192 B1 | * | 5/2001 | Brennan et al. ............. 381/314 |
| 6,266,687 B1 | * | 7/2001 | Leyonhjelm et al. ........ 708/420 |

OTHER PUBLICATIONS

S. Lawrence Marple, Jr., "Computing the Discrete–Time 'Analytic' Signal Via FFT", Conference Record of the Thirty–First Asilomar Conference on Signals, Systems & Computers, vol. 2, Nov. 1997, pp. 1322–1325.
John J. Shynk, "Frequency–Domain and Multirate Adaptive Filtering", *IEEE Signal Processing Magazine*, vol. 9, No. 1, Jan. 1992, pp. 14–37.
Gregory A. Clark, Sydney R. Parker, and Sanjit K. Mitra, "A Unified Approach to Time– and Frequency–Domain Realization of FIR Adaptive Digital Filters", *IEEE Transactions on Acoustics, Speech, and Signal Processing*, vol. ASSP–31, No. 5, Oct. 1983, pp. 1073–1083.

* cited by examiner

*Primary Examiner*—Young T. Tse
(74) *Attorney, Agent, or Firm*—Akin, Gump, Strauss, Hauer & Feld, L.L.P.

(57) ABSTRACT

The present invention discloses a novel scheme of performing frequency domain filtering that does not require a Hilbert transform and which is faster than equivalent FIR filtering schemes. Such a scheme has applications in implementing filters in voice band modems on OSP platforms and in numerous other applications as well. The scheme of the present invention is shown to be superior in term of CPU resource consumption and memory storage space when compared with an equivalent implementation using prior art time domain convolution techniques. The scheme of the present invention permits the delay buffer in the far end echo canceler to store the signal in real format rather than complex format, thus reducing memory requirements by half. The present invention implements a real to analytic fast convolution in the frequency domain which uses zero CPU resources.

14 Claims, 10 Drawing Sheets

METHOD OF FREQUENCY DOMAIN FILTERING EMPLOYING A REAL TO ANALYTIC TRANSFORM

This application is a continuation of U.S. patent application Ser. No. 09/146,878, filed Sep. 3, 1998, now abandoned.

FIELD OF THE INVENTION

The present invention relates generally to filtering and more particularly relates to a method for performing frequency domain filtering employing a real to analytic transform.

BACKGROUND OF THE INVENTION

Many digital signal processing (DSP) applications employ digital filtering techniques in order to filter out unwanted signals or noisy frequency components within signals. The implementation of such digital filters is often performed via the use of finite impulse response (FIR) filtering which is a well known method of implementing a convolution. This method requires K multiply and accumulate (MAC) operations per input, where K is the number of taps implemented in the filter. The method generates an inherent delay of approximately K/2 samples. If the sampling frequency of the input (and output) signals is $F_S$ then the number of MACs performed every second is $F_S*K$. For large filters or at high sampling rates this may become a burden for the computational machine performing the processing.

A technique well known in the art that can be used to overcome these tight computational constraints employs Fast Convolution (FC) which utilizes the Fast Fourrier Transform (FFT) and the Inverse Fast Fourrier Transform (IFFT). While this technique may dramatically reduce the computational requirements for the processor, it requires gathering and processing the data in blocks of size N, with N usually being a radix-2 quantity. In order to gain a significant reduction of the computational requirements, N has to be significantly larger than K.

The major disadvantage of this method is that it introduces an inherent delay of size N, thus increasing the delay significantly with respect to the straightforward FIR method.

Numerous applications of Fast Convolution are known in the art. The technique is mostly used where the inherent delay introduced by the processing is either not critical to the application or is needed in order to compensate for other delays in the system.

An example of the use of the Fast Convolution technique may be found in voice band modem applications such as ITU V.32bis or ITU V.34. The technique is used to remove the echo signal generated by various line conditions and impairments. In particular, the far end echo canceler (FEEC) cancels the received echo which was generated on the remote side. The round trip delay (RTD) of the echo ranges from 30 ms to 2 seconds. In order to properly compensate for this delay and in order not to consume an enormous amount of processing resources, the FEEC must delay the input signal using a delay registry whose depth is approximately the round trip delay.

Since these modem applications require an inherent delay to compensate for the RTD introduced by the physical conditions, they can easily incorporate a Fast Convolution in order to alleviate the computational burden of the filter used to emulate the echo path.

Further, if the line condition impairments, e.g., frequency domain multiplexing up conversion and down conversion, introduce a frequency offset, the FEEC must 'rotate' the emulated echo by the same frequency offset. The frequency offset can be tracked using phase locked loop (PLL) circuitry. However, the quadrature component of the transmitted signal must either be stored beforehand or derived from the in-phase component. The former doubles the delays registry whereas the latter requires the use of an additional Hilbert filter which increases the computational intensity.

A typical prior art modem scheme will now be described. Typical prior art modem implementation schemes, such as the one illustrated in FIG. 1, comprise a data access arrangement (DAA) 42, transmitter 32, receiver 34, digital to analog converter (D/A) 38 and analog to digital converter (A/D) 40. In addition, the full duplex voice band modem also employs finite impulse response (FIR) adaptive filters. Such FIR filters include the far end echo canceler 41 FIR, the near end echo canceler 33 FIR and the equalizer FIR within the receiver 34. During operation, the communication system embodying the modem is usually required to cope with a vast majority of different communication channels each posing diverse channel and echo impairments.

As discussed above, the relatively long length of the various filters that is required to cope with the worst case impairments requires a large amount of processor resources. In order to reduce the burden of the filter processing on CPU usage, several well known DSP techniques can be utilized in implementing the above mentioned FIR filters, such as the 'overlap and save' and the 'overlap and add' employing the FFT and the IFFT.

The use of such techniques as the 'overlap and save' and the 'overlap and add' methods in dedicated DSP hardware implementations can save a great deal of processor resources since such DSP processors have optimized hardware designed to perform signal processing functions. Examples of signal processing functions that are typically optimized and implemented in hardware include bit reversal, modulo counting, multiply and add functions, barrel shifters, etc. These hardware signal processing functions make possible highly optimized, fast and efficient FFT and IFFT implementations.

SUMMARY OF THE INVENTION

Accordingly, the present invention has been developed to provide a method of frequency domain filtering that overcomes the limitations and disadvantages of the prior art.

The limitations of prior art frequency domain fast convolution techniques include requiring an additional amount of CPU resources in cases where a Hilbert filtering transform is required in order to obtain the quadrature component from the in-phase one and create an analytic signal, i.e., a complex signal which has an in-phase component as its real part and a quadrature component as its imaginary part—'real to analytic conversion.' Such a signal has either positive or negative frequency components and therefore can easily undergo a frequency shift operation.

Accordingly, it is an object of the present invention to provide a method of implementing a real to analytic conversion utilizing frequency domain convolution which uses negligible additional CPU resources.

Another object of the present invention is to provide a method for real to analytic conversion utilizing an 'overlap and save' frequency domain convolution which uses negligible additional CPU resources.

There is provided in accordance with the present invention a method of performing real to analytic fast convolution on a real input block and a set of real Finite Impulse Response (FIR) coefficients to generate a complex output vector, the method comprising the steps of performing a first Fast Fourrier Transformation (FFT) on the real input block, performing a second FFT on the set of FIR coefficients, multiplying the results of the second FFT element by element with the frequency response of an ideal real to analytic transform to form a first product, multiplying the results of the first FFT element by element with the first product to yield a second product, performing an Inverse Fast Fourrier Transformation (IFFT) on the results of the second product to generate a complex output vector and forming a first real output block from the real portion of the output vector.

The ideal real to analytic transform may comprise a positive frequency real to analytic transform or a negative frequency real to analytic transform.

There is also provided in accordance with the present invention a method of performing real to analytic fast convolution on a real input block and a set of real Finite Impulse Response (FIR) coefficients to generate a complex output vector, the method comprising the steps of performing a first Fast Fourrier Transformation (FFT) on the real input block, performing a second FFT on the set of FIR coefficients, multiplying the results of the first FFT element by element with the frequency response of an ideal real to analytic transform to yield a first product, multiplying the results of the second FFT element by element with the first product to yield a second product, performing an Inverse Fast Fourrier Transformation (IFFT) on the second product to generate a complex output vector and forming a first real output block from the real portion of the output vector.

In addition, there is provided in accordance with the present invention an apparatus for performing filtering and frequency shifting on a real input signal, the apparatus outputting a real output signal, the apparatus comprising real to analytic means for performing a real to analytic fast convolution on the input signal, the real to analytic means operative to output a first complex signal, frequency generator means for generating a second complex signal represented by $e^{j\omega t}$, the frequency generator means operative to generate the second complex signal having any arbitrary frequency $\omega$, a multiplier coupled to the real to analytic means and the frequency generator means, the multiplier for multiplying the first complex signal by the second complex signal to yield a third complex signal and real means coupled to the multiplier, the multiplier for taking the real component of the third complex signal to yield the real output signal.

The real to analytic means comprises means for performing a Fast Fourrier Transformation (FFT) on the real input to yield a first FFT output, means for performing a second FFT on a set of real Finite Impulse Response (FIR) coefficients to yield a second FFT output, means for multiplying the second FFT output element by element with the frequency response of an ideal real to analytic transform to yield a first product, means for multiplying the first FFT output element by element with the first product to yield a second product and means for performing an Inverse Fast Fourrier Transformation (IFFT) on the second product to generate the first complex signal.

Further, there is provided in accordance with the present invention a method of performing filtering and frequency shifting on a real input signal so as to generate a real output signal, the method comprising the steps of performing a real to analytic fast convolution on the input signal to yield a first complex signal, generating a second complex signal represented by $e^{j\omega t}$, wherein the frequency generated is any arbitrary frequency $\omega$, multiplying the first complex signal by the second complex signal to yield a third complex signal and taking the real component of the third complex signal to yield the real output signal.

The step of performing a real to analytic fast convolution comprises the steps of performing a first Fast Fourrier Transformation (FFT) on the real input signal, performing a second FFT on a set of Finite Impulse Response (FIR) coefficients, multiplying the results of the second FFT element by element with the frequency response of an ideal real to analytic transform to form a first product, multiplying the results of the first FFT element by element with the first product to yield a second product and performing an Inverse Fast Fourrier Transformation (IFFT) on the results of the second product to generate a complex output vector.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| CO | Central Office |
| CPU | Central Processing Unit |
| DAA | Data Access Arrangement |
| DSP | Digital Signal Processing |

-continued

| Term | Definition |
| --- | --- |
| FC | Fast Convolution |
| FDM | Frequency Division Multiplexing |
| FEED | Far End Echo Cancellation |
| FFT | Fast Fourrier Transform |
| FIFO | First In First Out |
| FIR | Finite Impulse Response |
| IFFT | Inverse Fast Fourrier Transform |
| ISI | Intersymbol Interference |
| ITU | International Telecommunication Union |
| MAC | Multiply and Accumulate |
| PLL | Phase Lock Loop |
| RF | Radio Frequency |
| RTD | Round Trip Delay |
| SSB | Single Sideband |

General Description

For illustrative purposes only, the methods taught by the present invention are demonstrated within the context of the far end echo canceler filter function in a voice band full duplex communication system such as the ITU V.32bis modem whose maximum data rate is 14,400 bps or the ITU V.34 modem whose maximum data rate is 28,800 bps. The far end echo canceler filter can utilize a fast convolution scheme such as the scheme known as 'overlap and save.' It should be noted that one skilled in the art may apply the scheme taught by the present invention to other filters within the modem such as the equalizer filter which performs intersymbol interference (ISI) cancellation, the near end echo canceler filter and to other signal processing applications such as radio frequency (RF) modems and acoustic echo cancelers. In addition, one skilled in the art may apply the method of the present invention to other fast convolution schemes such as the 'overlap and add' technique.

Figure 1:
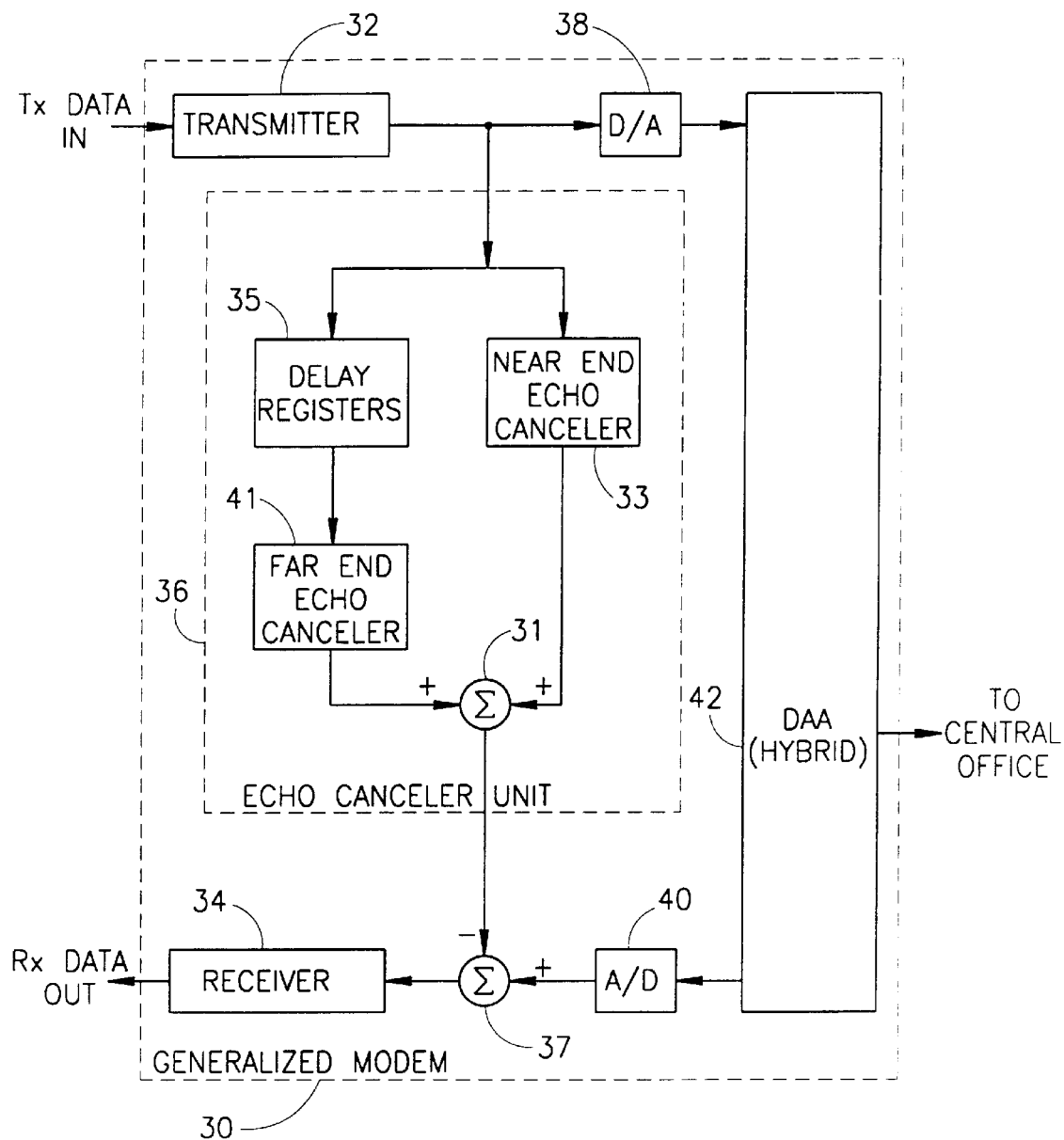
FIG. 1 is a high level block diagram illustrating a typical implementation of a prior art full duplex voice band modem.

As described previously, the prior art full duplex voice band modem of FIG. 1 comprises a transmitter 32, a receiver 34, an echo canceler unit 36, a summer 37, a D/A converter 38, an A/D converter 40 and a DAA or hybrid 42. The echo canceler unit comprises a near end echo canceler filter 33, a delay line 35, a far end echo canceler filter 41 and a summer 31. The transmitter receives transmit data in from a Tx data in port and outputs transmit (Tx) samples to the echo canceler unit 36 and the D/A converter 38. The DAA functions to match the impedance between the telephone line and the transmitter and receiver by transforming balanced analog voltage on the two-wire pair from the central office (CO) to two two-wire unbalanced pairs, one for the transmitter and one for the receiver and vice versa. The echo canceler unit 36 functions to remove echoes from the received signal by applying an adaptive near end filter to cancel the near end echo and an adaptive far end filter to cancel the far end echo. The signal at the input to the far end filter is delayed by a delay line 35 so as to match the round trip delay (RTD) introduced by the network. The signals at the output of the far end filter and the near end filter are summed by summer 31 to produce the output of the echo canceler unit. The output of the echo canceler is then subtracted from the received signal using the summer 37. The receiver outputs a digital receive Rx data out signal.

Figure 2:
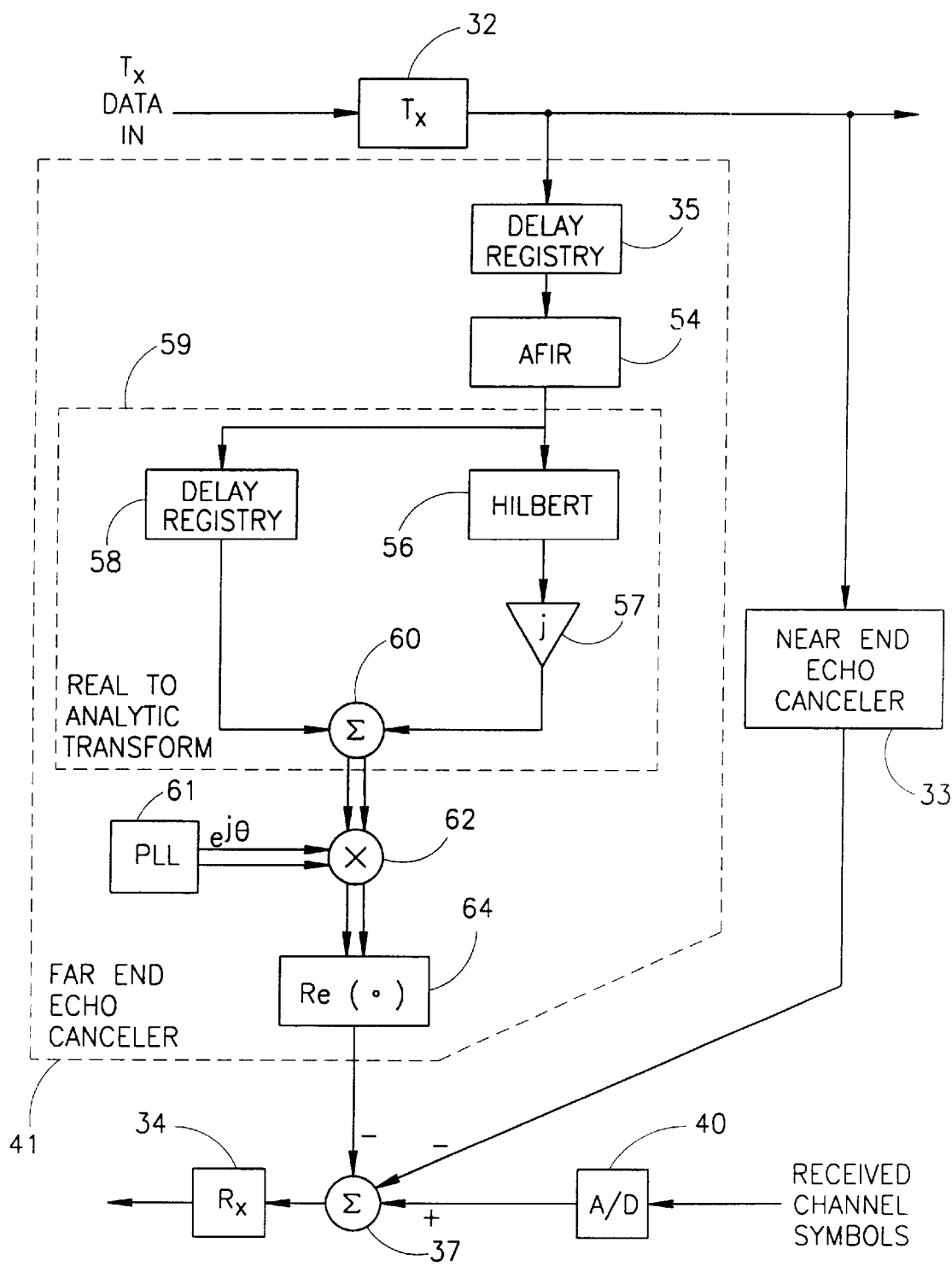
FIG. 2 is a detailed block diagram illustrating a first prior art implementation of the far end echo canceler.

A detailed block diagram illustrating a prior art implementation of a passband far end echo canceler is shown in FIG. 2. The far end echo canceler 41 comprises an adaptive FIR filter 54, Hilbert transform 56, a delay registry 58, multiplication by 'j' ($\sqrt{-1}$) function 57, summer 60, phase lock loop (PLL) module 61, multiplier 62 and real component extraction function 64.

The transmitter Tx 32 generates a modulated pass band sample stream. The sample stream is delayed using a delay registry 35, whose minimum depth is the maximal round trip delay introduced by the communication network. The signal then passes through the adaptive FIR filter 54 which functions to emulate the echo impairment path. The signal at this point is real. The signal then undergoes a real to analytic transform 59 which comprises a Hilbert transform function 56, delay registry 58, multiplication by ($\sqrt{-1}$), and summer 60. The signal then undergoes in-phase to quadrature conversion via the Hilbert transform function 56 which is implemented using an FIR filter. The real portion is delayed by delay registry 58 which functions to compensate for the delay introduced by the FIR Hilbert transform implementation. The depth of delay registry 58 is exactly half the number of taps of the FIR filter used to implement the Hilbert transform function.

The real and imaginary portions of the signal are combined by summer 60 to yield an analytic signal. The complex output signal of the real to analytic transform 59 is multiplied by an adaptive phase rotation correction factor, generated by the PLL 61, via multiplier 62. The phase lock loop 61 functions to estimate the accumulated phase offset $e^{j\Theta}$ generated by the communication network. The real portion of the output of the multiplier 62 is then subtracted from the output of the A/D converter 40 along with the output of the near end echo canceler 33 via summer 37. The resulting output of summer 37 is then input to the receiver Rx 34.

The major disadvantage of this prior art echo canceler scheme, however, is the high CPU resource consumption of the Hilbert transform.

Figure 3:
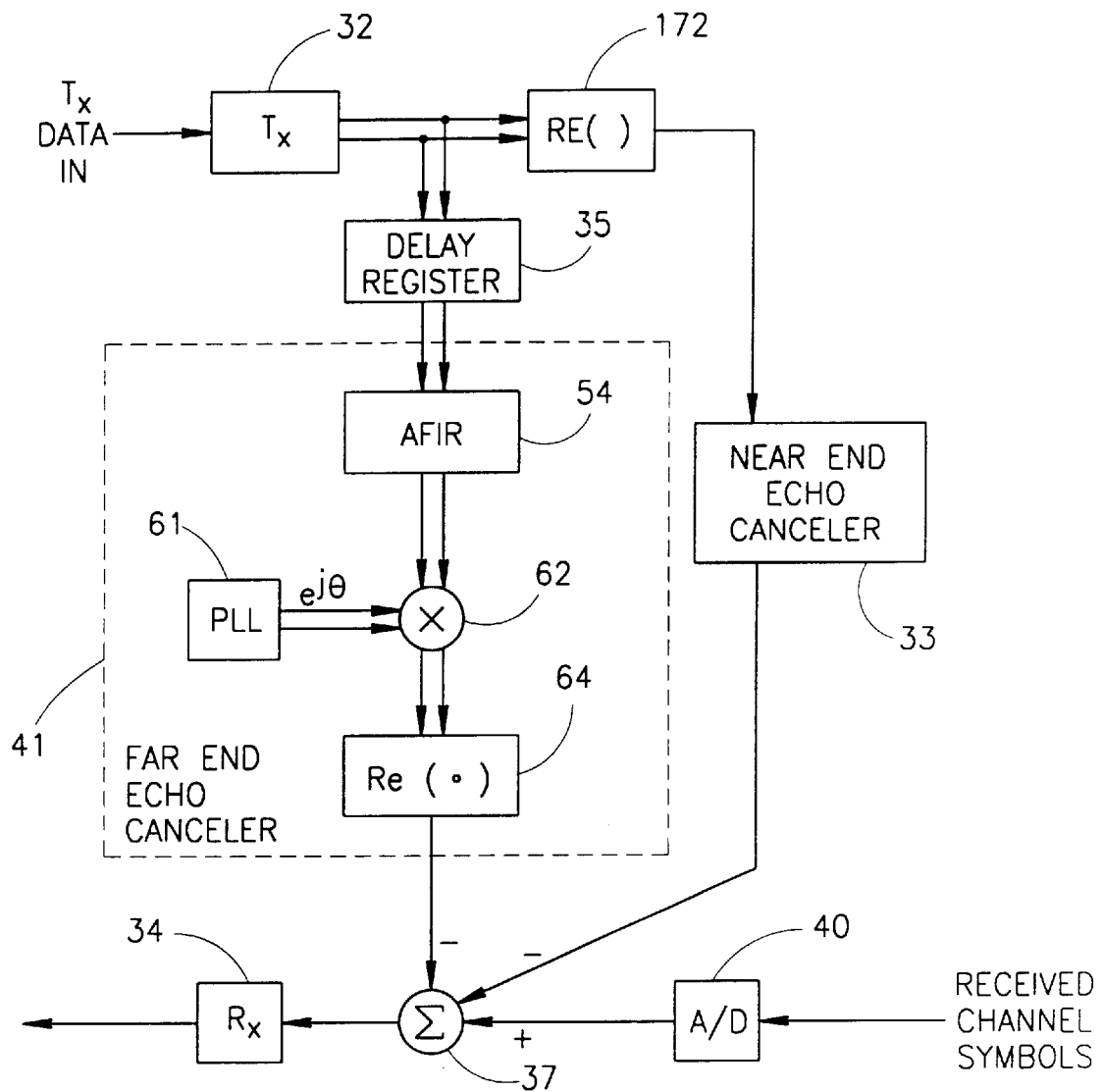
FIG. 3 is a detailed block diagram illustrating a second prior art implementation of the far end echo canceler.

A detailed block diagram illustrating a second prior art implementation of the far end echo canceler that attempts to overcome the problems of the far end echo canceler of FIG. 2 is shown in FIG. 3. The echo canceler 41 comprises an adaptive FIR filter 54, multiplier 62, phase lock loop 61 and real function 64.

The transmitter Tx 32 generates a complex analytic signal. An analytic signal has only one sided frequency components when viewed in the frequency domain (either positive or negative—positive in this implementation). The real portion of the complex sample stream is transmitted and passed to the near end echo canceler while the complex sample stream is delayed via delay registers 35. The delayed complex signal is filtered by adaptive FIR filter 54 which functions to emulate the echo impairment path. The complex output signal of the AFIR filter is multiplied by an adaptive phase rotation correction factor $e^{j\Theta}$, generated by the PLL 61, via multiplier 62. The real portion 64 of the output of the multiplier is then subtracted from the A/D converter 40 samples along with the output of the near end echo canceler 33 via summer 37. This result is then input to the receiver Rx 34.

The second prior art implementation of the far end echo canceler presented above also suffers from several disadvantages. One disadvantage is that the memory requirements for the delay registers is doubled due to complex signal storage. Another disadvantage is that, although the CPU resource consuming FIR Hilbert transform is eliminated, the CPU resource consumption of the adaptive FIR is doubled due to the fact that the adaptive filter operates on a complex signal rather than just the real portion of the signal. Since the AFIR 54 is usually a long filter, which compensates for the worst case echo impairment, this implementation requires a great deal of CPU resources.

Figure 4:
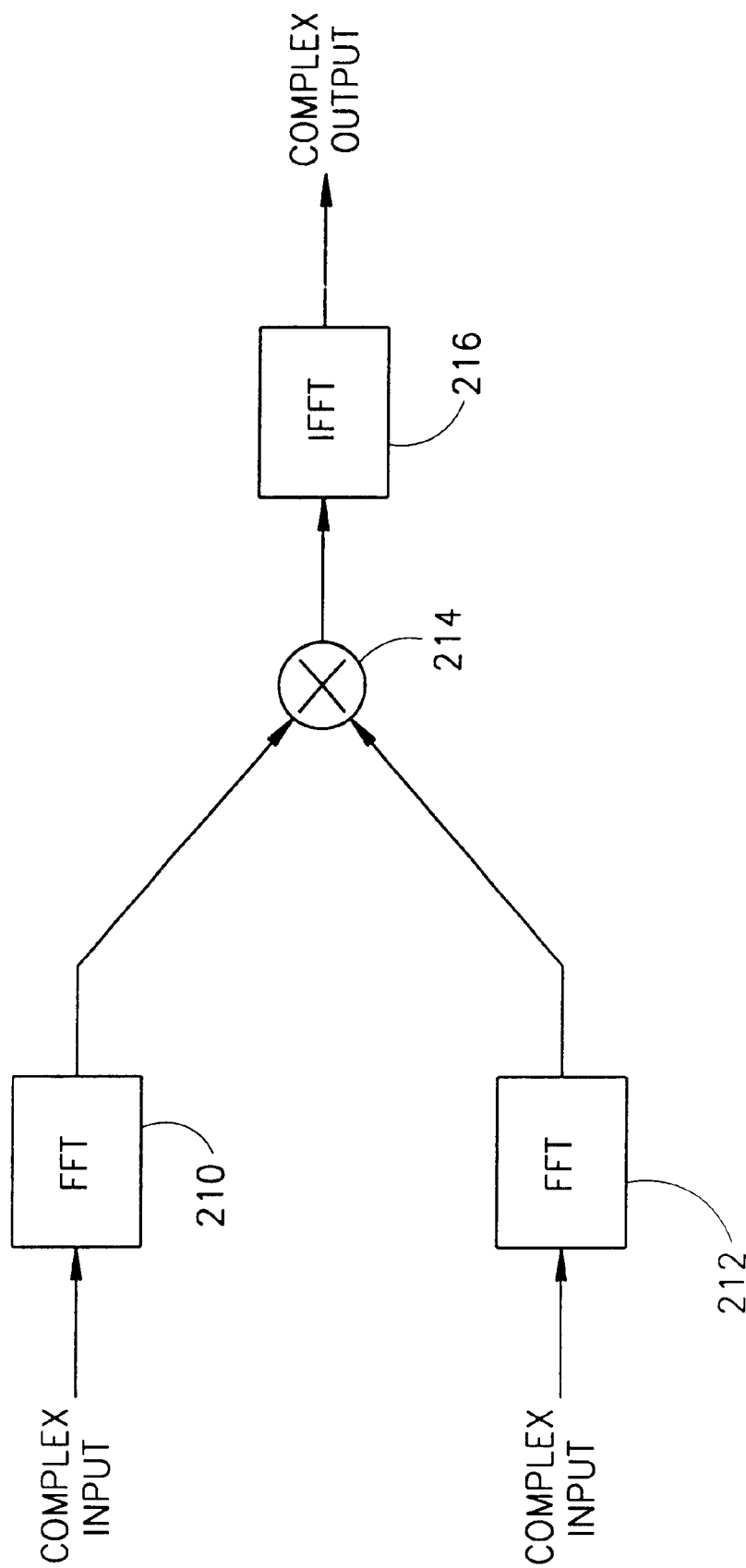
FIG. 4 is a high level block diagram illustrating a prior art frequency domain convolution apparratus.

A high level block diagram illustrating a prior art frequency domain convolution method is shown in FIG. 4. This method is widely used to convolve two time domain signals by multiplying their Fast Fourrier Transforms. The method comprises taking a first complex input and performing a first FFT function 210, taking a second complex input and performing a second FFT function 212 and then multiplying the results of the first and second FFT functions using a multiplier 214. An IFFT function 216 is then performed on the results of the multiplication to yield a complex output.

Figure 5:
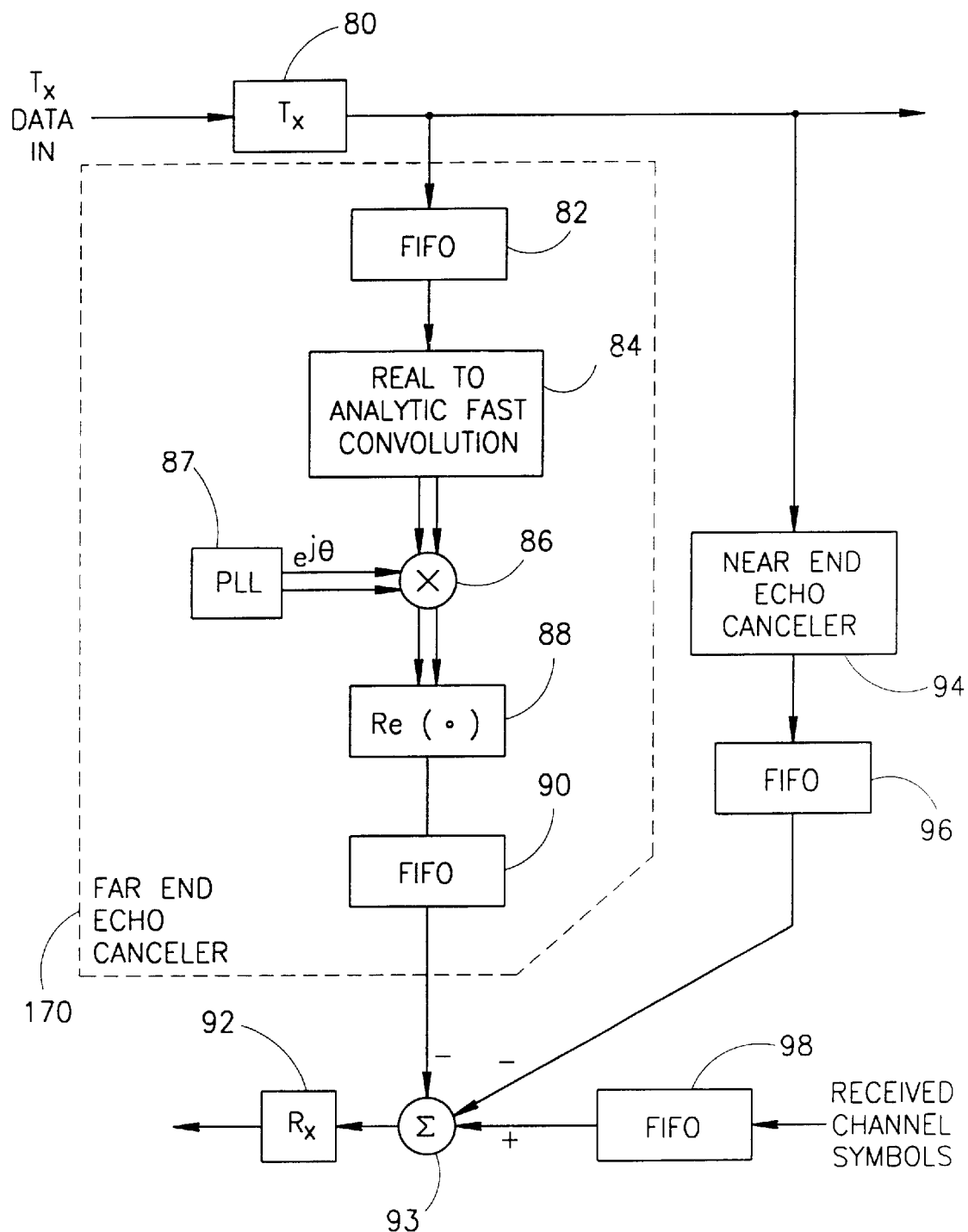
FIG. 5 is a detailed block diagram illustrating a far end echo canceler utilizing real to analytic fast convolution constructed in accordance with an embodiment of the present invention.

The frequency domain filtering scheme provided by the present invention overcomes the disadvantages and limitations of the prior art. A detailed block diagram illustrating a far end echo canceler utilizing real to analytic fast convolution constructed in accordance with an embodiment of the present invention is shown in FIG. 5. The far end echo canceler 170 embodying the method of the present invention comprises a real to analytic fast convolution function 84, multiplier 86, PLL function 87, real function 88 and first in first out (FIFO) (e.g., delay registers) 90.

The transmitter Tx 80 generates a passband (i.e., real component only) sample output stream. The sample stream is delayed using delay registry (i.e., FIFO) 82. Each sample output from the transmitter is pushed into FIFO 82. When the FIFO 82 fills, a buffer having a length N-K is input to the real to analytic fast convolution block 84 of the present invention which performs both adaptive filtering and a real to analytic conversion. The value N is the length of the FFT performed by the method and the value K is the length of the filter implemented by the method. Note that output of the real to analytic fast convolution block 84, the PLL 87 and the multiplier 86 are complex, as represented by the double lines emanating from each.

The complex signal output by the real to analytic fast convolution block 84 is multiplied by an adaptive phase rotation correction factor $e^{j\theta}$ which is generated by the PLL 87. The real portion of the signal output by the multiplier 86 is then stored in a FIFO 90. The received signal output from the A/D converter is stored in a FIFO 98. In addition, the signal from the near end echo canceler 94 is stored in a FIFO 96.

Each sample input to the receiver 92 is produced by subtracting one sample from FIFO 90 and one sample from FIFO 96 from a sample taken from FIFO 98. The lengths of each of the delay registers or FIFOs used in the far end echo canceler are as follows:

| Delay Register/FIFO | Length |
|---|---|
| FIFO 82 | max(RTD, N-K) |
| FIFOs 96, 98 | max(0, N-K-RTD) |
| FIFO 90 | N-K |

Where RTD is the estimated round trip delay measured in number of sample times.

In the prior art echo canceling schemes presented in FIGS. 2 and 3, the size of the delay registers is exactly the estimated round trip delay. However, since the application of the FFT algorithm requires a full buffer of length equal to the real to analytic fast convolution block 84 input buffer length N-K, it is required that the size of the FIFO 82 be greater than or equal to N-K samples. The output of the real to analytic fast convolution block 84, after phase compensation and taking the real portion, must be stored in another FIFO 90. The size of the FIFO 90 is thus equal to the number of valid samples output by the real to analytic fast convolution block for each input buffer. In addition, if the round trip delay is less than N-K, then the extra delay introduced by the FIFO 82 must be compensated for by the pair of FIFOs 96, 98 each having a length N-K-RTD.

The method of the present invention is advantageous in that it alleviates both the memory and CPU resource utilization problems described previously. Memory utilization is lowered due to the fact that only real samples are stored in the delay registry (i.e., FIFOs) thus obviating the requirement of double memories as in the second prior art scheme.

CPU resource utilization is also lowered since the real to analytic fast convolution method of the present invention eliminates the need for time domain Hilbert transform filtering and is a much more efficient way of performing convolution on most computation machines.

Figure 6:
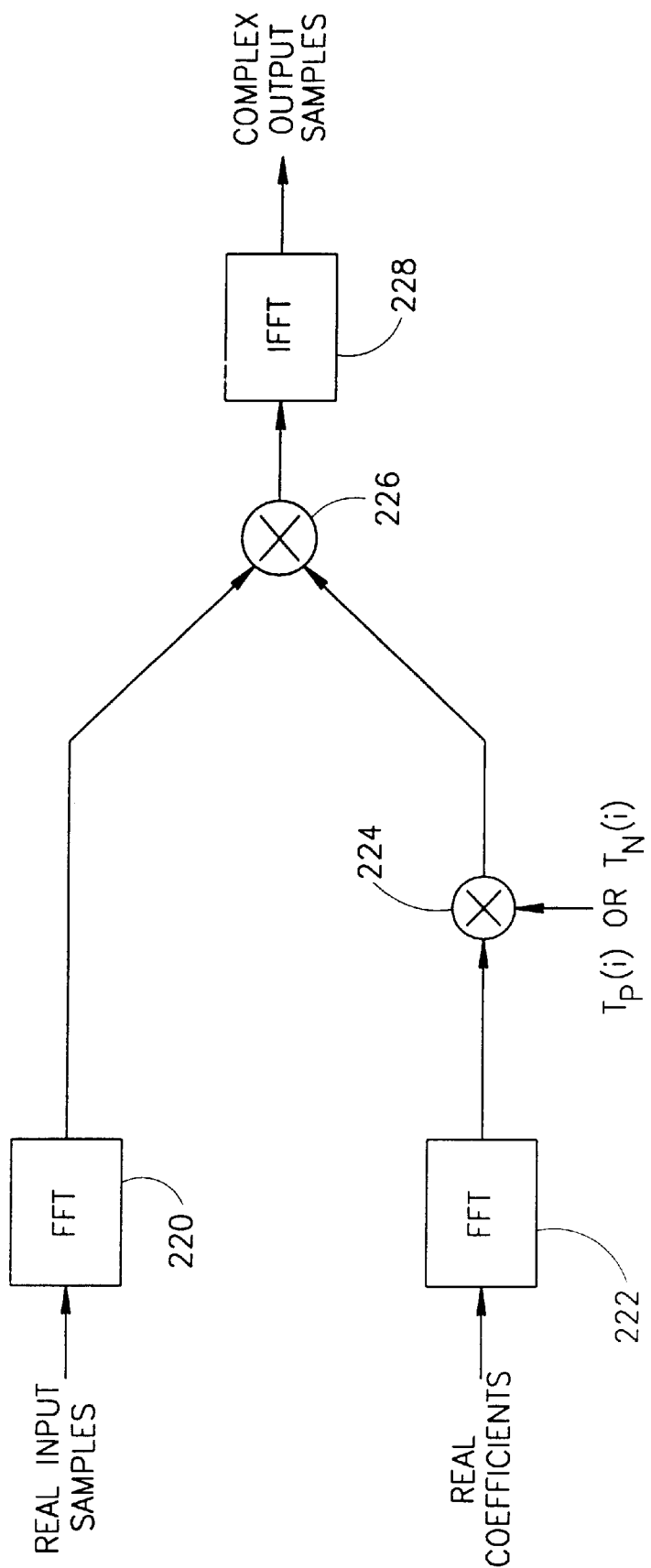
FIG. 6 is a high level block diagram illustrating a first embodiment of a real to analytic fast convolution scheme of the present invention.

A high level block diagram illustrating a first embodiment of a real to analytic fast convolution scheme of the present invention is shown in FIG. 6. The scheme is used to convolve the analytic part of real input samples with real coefficients. A first FFT 220 is performed on the real input samples and a second FFT 222 is performed on the real coefficients. Then, real to analytic conversion is performed in the frequency domain by multiplying the frequency domain coefficients with the frequency response of an ideal real to analytic transform element by element. The response in the case of a positive frequency analytic signal is given by $$T_P(i) = \begin{cases} 2 & 0 < i < N/2 \\ 1 & i = 0 \text{ or } i = N/2 \\ 0 & \text{else} \end{cases}$$

where $T_P(i)$ is the frequency response of an ideal real to analytic (positive frequency) transform, $0 \leq i < N$ and N is the transform size.

In the case of a negative frequency analytic signal, the response is given by $$T_N(i) = \begin{cases} 2 & N/2 < i < N \\ 1 & i = 0 \text{ or } i = N/2 \\ 0 & \text{else} \end{cases}$$

where $T_N(i)$ is the frequency response of an ideal real to analytic (negative frequency) transform, $0 \leq i < N$ and N is the transform size. Note that when using $T_N(i)$, i.e., negative frequencies, the frequency shift multiplier $e^{j\theta}$ has to be conjugated ($e^{-j\theta}$). The half zeroed frequency spectrum and the results of the first FFT are then multiplied element by element via multiplier 226. The results of the multiplication are then input to an IFFT function 228 to yield complex output samples.

Figure 7:
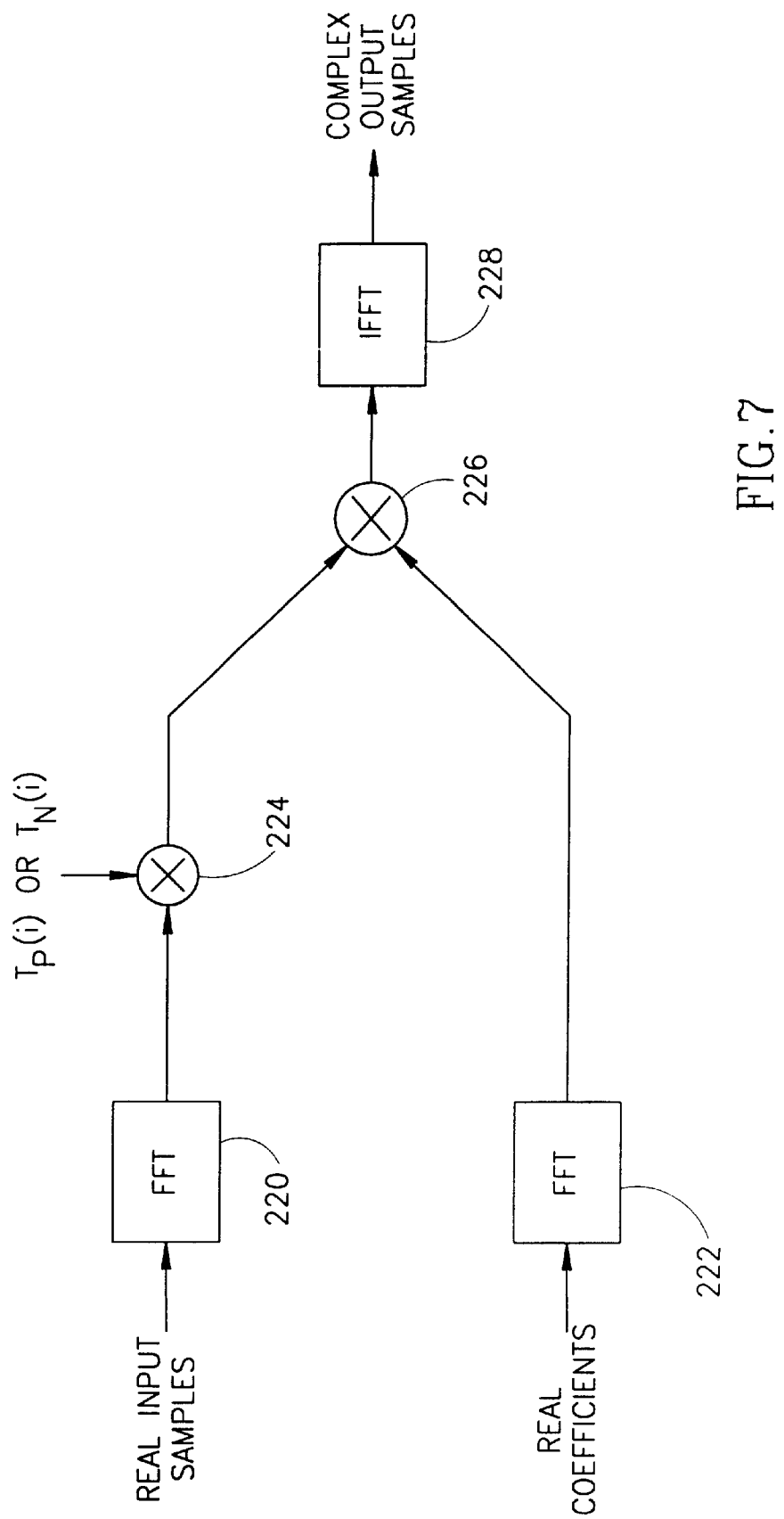
FIG. 7 is a high level block diagram illustrating a second embodiment of a real to analytic fast convolution scheme of the present invention.

A high level block diagram illustrating a second embodiment of a real to analytic fast convolution scheme of the present invention is shown in FIG. 7. This scheme is very similar to the scheme shown in FIG. 6. The difference being that the FFT of the real input samples, rather than the real coefficients, are multiplied by the frequency response of an ideal real to analytic transform element by element via multiplier 224. In both schemes, the results achieved are the same, i.e., the output of the multiplier 226 is identical using both schemes.

Figure 8:
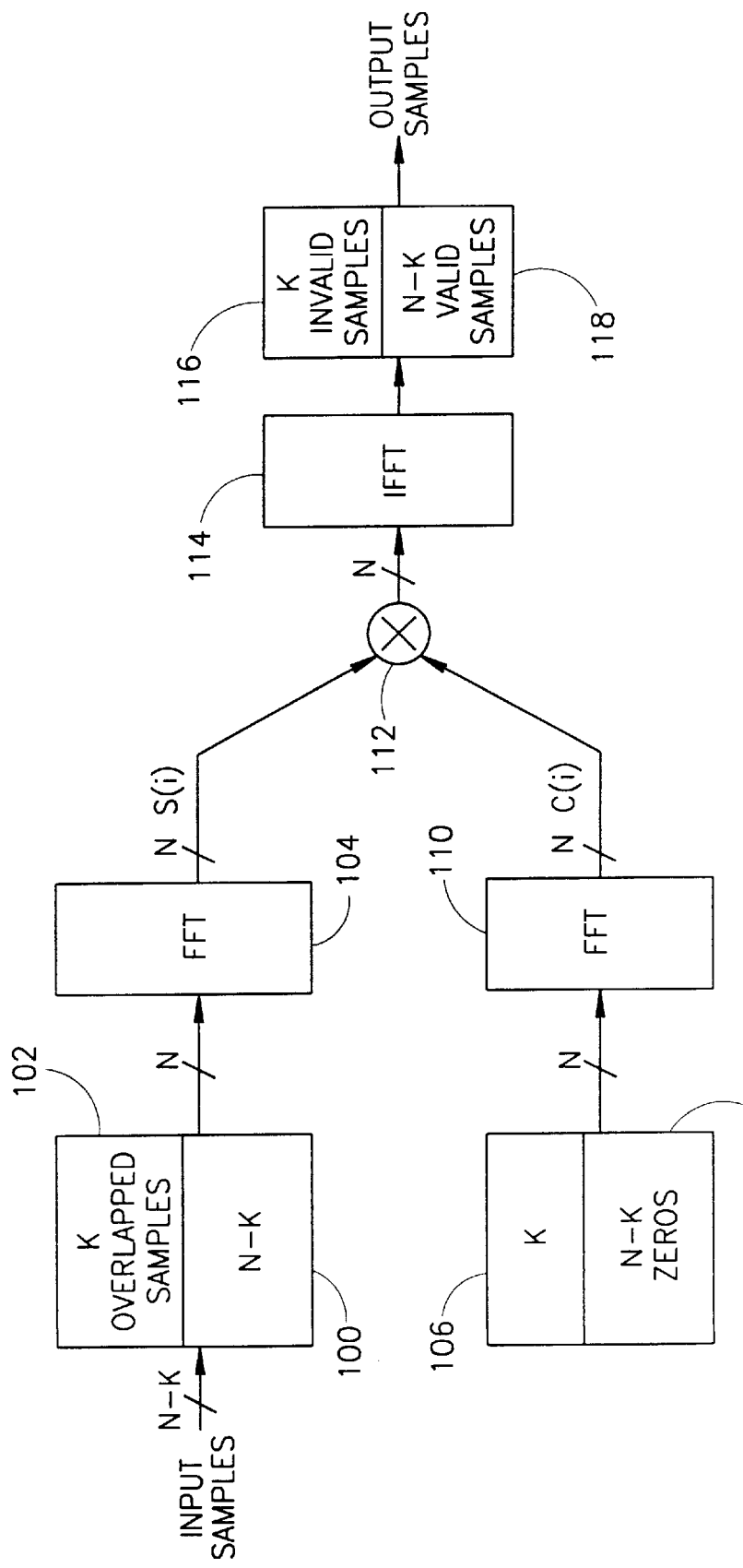
FIG. 8 is a high level block diagram illustrating the prior art 'overlap and save' frequency domain block convolution scheme.

A high level block diagram illustrating the prior art 'overlap and save' frequency domain block convolution scheme is shown in FIG. 8. K samples 102 are placed in a buffer and combined with N-K input samples 100 to form a vector of length N. The first K samples in the vector are provided from internal memory which is used to store the last K samples of the input vector from the previous processing cycle.

The vector of size N then undergoes an FFT transform 104 of size N to yield an output vector S(i). The filter impulse response of length K 106, which are the FIR coefficients, is placed in a buffer of length N. The remainder of the buffer 108 which has a size N-K is padded with zeros. The combination forms a coefficient vector of length N which then undergoes an FFT transform 110 of size N to yield a frequency domain complex coefficient vector C(i) of size N. Note that if the filter is time invariant, the vector C(i) can be computed beforehand or, alternatively, the vector C(i) can be computed on the fly.

The two resulting frequency domain vectors S(i) and C(i) are then multiplied element by element by multiplier 112. The output of the multiplier, having a size N, then undergoes an inverse FFT transform. The resultant vector comprises N-K valid samples and K invalid samples. Invalid samples are generated as a result of the cyclic convolution performed in the fast convolution scheme (FFT, multiplication, IFFT). The N-K valid output samples are extracted and the last K samples from the input vector are saved for the next processing block. Thus, this prior art 'overlap and save' frequency domain block convolution scheme of FIG. 8 is able to generate N-K output samples for every N-K input samples.

Figure 9:
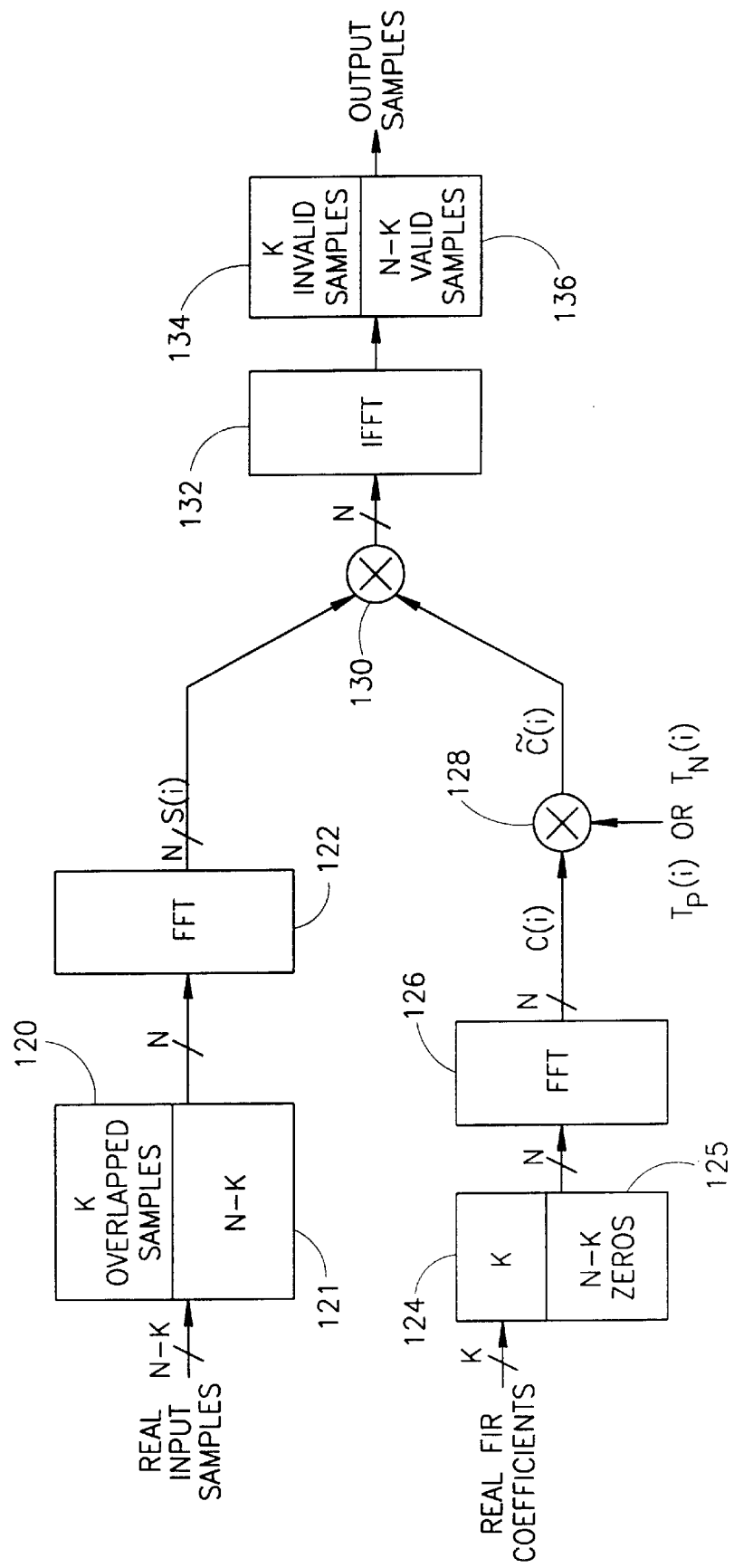
FIG. 9 is a high level block diagram illustrating a frequency domain filter incorporating a real to analytic conversion filter constructed in accordance with an embodiment of the present invention.

A high level block diagram illustrating a frequency domain filter incorporating a real to analytic conversion constructed in accordance with an embodiment of the present invention is shown in FIG. 9. A buffer is filled with real input samples to form an overlapping windowed buffer similar to the scheme of FIG. 8. K samples 120 are placed in a buffer and combined with N-K input samples 121 to form a vector of length N. The first K samples in the vector are provided from internal memory which is used to store the last K samples of the input vector from the previous processing cycle. The last N-K samples making up the input vector are the N-K samples input to the real to analytic fast convolution block 84 (FIG. 5). The input vector then undergoes an FFT transform 122 of size N to yield S(i).

The filter impulse response of length K 124, which comprises the FIR coefficients, is placed in a buffer of length N. The remainder of the buffer 125 which has a size N-K is padded with zeros. The combination forms a coefficient vector of length N which then undergoes an FFT transform 126 of size N to yield a frequency domain complex coefficient vector C(i) of size N. Note that if the filter is time invariant, the vector C(i) can be computed beforehand or, alternatively, can be computed on the fly.

Real to analytic conversion 128 in the frequency domain is then performed on the output of the FFT 126 by multiplying the frequency domain coefficients with the frequency response of an ideal real to analytic transform element by element. The response in the case of a positive frequency analytic signal is given by $$T_P(i) = \begin{cases} 2 & 0 < i < N/2 \\ 1 & i = 0 \text{ or } i = N/2 \\ 0 & \text{else} \end{cases}$$

where $T_P(i)$ is the frequency response of an ideal real to analytic (positive frequency) transform, $0 \leq i < N$ and N is the transform size.

In the case of a negative frequency analytic signal, the response is given by $$T_N(i) = \begin{cases} 2 & N/2 < i < N \\ 1 & i = 0 \text{ or } i = N/2 \\ 0 & \text{else} \end{cases}$$

where $T_N(i)$ is the frequency response of an ideal real to analytic (negative frequency) transform $0 \leq i < N$ and N is the transform size. Note that when using $T_N(i)$, i.e., negative frequencies, the frequency shift multiplier $e^{j\Theta}$ has to be conjugated ($e^{-j\Theta}$). It is well known in the art that in the case of a real time domain signal, zeroing of the negative frequency components is equivalent to a real to analytic transform. This reduces the effective size of the vector $\tilde{C}(i)$ to N/2+1. In addition, if the FIR coefficients are time invariant, $\tilde{C}(i)$ can be computed beforehand or on the fly.

The output of the real to analytic conversion 128 is then multiplied by the vector S(i) output from the FFT block 122 via multiplier 130. Note that the element by element block multiplication requires only N/2+1 complex multiplications. An inverse FFT 132 is then performed on the resultant block output from the multiplier 130. The resultant vector output from the IFFT block 132 comprises N-K valid samples 136 and K invalid samples 134. The invalid samples are due to the cyclic convolution performed in the last convolution scheme (FFT, multiplication, IFFT). Thus, for every N-K input samples, the real to analytic fast convolution block 84 (FIG. 5) generates N-K output samples.

There are three major advantages to performing frequency domain convolution using the method taught by the present invention. The first advantage is memory conservation. Doubling of the memory is not required, unlike in the prior art far end echo canceler of FIG. 3.

The second advantage is reduced CPU utilization. The Hilbert filter 56 (FIG. 2) is obviated by the method of the present invention. Furthermore, the prior art 'overlap and save' scheme of FIG. 8 is made more efficient since, in the frequency domain, only half the number of multiplications are needed. In addition, one skilled in the art can exploit the zeroing of the negative frequency components in the first stage of the IFFT to reduce CPU utilization even further and compute only half of the points in S(i).

The third advantage is that the fast convolution scheme of FIGS. 5 and 9 is more efficient in terms of the number of complex multiplications performed per output sample than in the prior art implementation of FIGS. 2 and 3 due to the relatively low computational complexities associated with the FFT and IFFT algorithms in comparison to FIR filtering on most computational machines.

Another application of the frequency domain filtering scheme of the present invention is in a frequency division multiplexing (FDM) system. Typical FDM communication systems function to multiplex a plurality of input channels onto a single output channel. Each input channel is first filtered to generate a bandwidth limited signal. After filtering, the signal is shifted in frequency by a particular amount corresponding to the unique frequency slot assigned to that input channel, i.e., single sideband (SSB) modulation.

Figure 10:
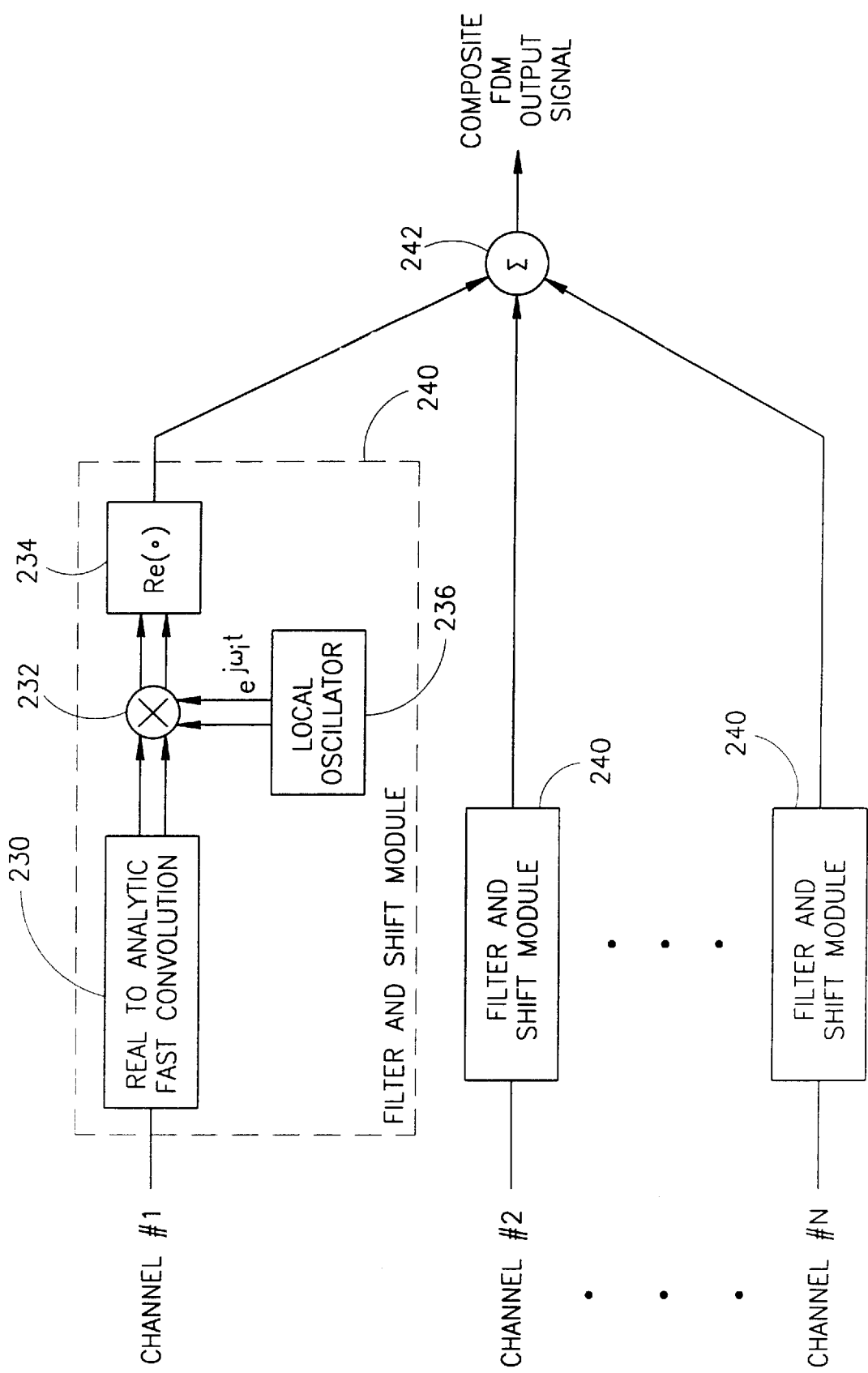
FIG. 10 is a high level block diagram illustrating the frequency domain filtering scheme of the present invention utilized in a frequency division multiplexing (FDM) application.

A high level block diagram illustrating the frequency domain filtering scheme of the present invention utilized in a frequency division multiplexing (FDM) application is shown in FIG. 10. A plurality of input channel signals, represented as channel #1 through channel #N are input to a bank of filter and shift modules 240. Each filter and shift module 240 comprises a real to analytic fast convolution block 230, multiplier 232, local oscillator 236 and a complex to real function block 234. Note that the outputs of the real to analytic fast convolution block 230, multiplier 232 and local oscillator 236 are complex signals. The functions performed by the real to analytic fast convolution block 230, multiplier 232 and complex to real function block 234 are identical to that of real to analytic fast convolution block 84, multiplier 86 and complex to real function block 88, respectively, each described previously in connection with FIG. 5. The local oscillator is a circuit which generates a sinusoidal waveform at a given frequency. It can be phase shifted to generate a 90 degree phase different signal signal, i.e., sine and cosine. The outputs of each filter and shift module 240 are added together via summer 242 to yield a composite FDM output signal.

The frequency shift for each channel is determined by the value of $\omega_i$ in the complex signal $e^{j\omega_i t}$ that is generated and output by the local oscillator 236. Each channel will have its own independent local oscillator whose frequency is $\omega_i$ where i is the channel number. Note that the channel input signal is filtered and shifted in frequency without the use of FIR filtering or Hilbert transforms.

The advantage of using the frequency domain filtering scheme of the present invention is that a Hilbert transform is not required. In addition to eliminating the need for a Hilbert transform, the frequency domain filtering scheme of the present invention is inherently faster than the equivalent FIR filter. The application of the present invention to an FDM system is appropriate since each input channel comprises a real signal rather than an analytic signal with complex real and imaginary parts.

While the invention has been described with respect to a limited number of embodiments, it will be appreciated that many variations, modifications and other applications of the invention may be made.

What is claimed is:

1. A method of performing real to analytic fast convolution on a real input block and a set of real Finite Impulse Response (FIR) coefficients to generate a complex output vector, said method comprising:

performing a first Fast Fourier Transformation (FFT) on said real input block;

performing a second FFT on said set of FIR coefficients;

multiplying the results of said second FFT element by element with the frequency response of an ideal real to analytic transform to form a first product;

multiplying the results of said first FFT element by element with said first product to yield a second product;

performing an Inverse Fast Fourier Transformation (IFFT) on the results of said second product to generate the complex output vector; and forming a first real output block from the real portion of said output vector.

2. The method according to claim 1, wherein said ideal real to analytic transform comprises a positive frequency real to analytic transform.

3. The method according to claim 1, wherein said ideal real to analytic transform comprises a negative frequency real to analytic transform.

4. A method of performing real to analytic fast convolution on a real input block and a set of real Finite Impulse Response (FIR) coefficients to generate a complex output vector, said method comprising:

performing a first Fast Fourier Transformation (FFT) on said real input block;

performing a second FFT on said set of FIR coefficients;

multiplying the results of said first FFT element by element with the frequency response of an ideal real to analytic transform to yield a first product;

multiplying the results of said second FFT element by element with said first product to yield a second product;

performing an Inverse Fast Fourier Transformation (IFFT) on said second product to generate the complex output vector; and forming a first real output block from the real portion of said output vector.

5. The method according to claim 4, wherein said ideal real to analytic transform comprises a positive frequency real to analytic transform.

6. The method according to claim 4, wherein said ideal real to analytic transform comprises a negative frequency real to analytic transform.

7. An apparatus for performing filtering and frequency shifting on a real input signal, said apparatus outputting a real output signal, said apparatus comprising:

real to analytic means for performing a real to analytic fast convolution on said input signal, said real to analytic means operative to output a first complex signal;

frequency generator means for generating a second complex signal represented by $e^{j\omega_i t}$, said frequency generator means operative to generate said second complex signal having any arbitrary frequency $\omega_i$;

a multiplier coupled to said real to analytic means and said frequency generator means, said multiplier for multiplying said first complex signal by said second complex signal to yield a third complex signal; and real means coupled to said multiplier, said real means for taking the real component of said third complex signal to yield said real output signal.

8. The apparatus according to claim 7, wherein said real to analytic means comprises:

means for performing a first Fast Fourier Transformation (FFT) on said real input to yield a first FFT output;

means for performing a second FFT on a set of real Finite Impulse Response (FIR) coefficients to yield a second FFT output;

means for multiplying said second FFT output element by element with the frequency response of an ideal real to analytic transform to yield a first product;

means for multiplying said first FFT output element by element with said first product to yield a second product; and means for performing an Inverse Fast Fourier Transformation (IFFT) on said second product to generate said first complex signal.

9. The apparatus according to claim 7, wherein said real to analytic means comprises:

means for performing a first Fast Fourier Transformation (FFT) on said real input to yield a first FFT output;

means for performing a second FFT on a set of real Finite Impulse Response (FIR) coefficients to yield a second FFT output;

means for multiplying said first FFT output element by element with the frequency response of an ideal real to analytic transform to yield a first product;

means for multiplying said second FFT output element by element with said first product to yield a second product; and means for performing an Inverse Fast Fourier Transformation (IFFT) on said second product to generate said first complex signal.

10. A method of performing filtering and frequency shifting on a real input signal so as to generate a real output signal, said method comprising:

performing a real to analytic fast convolution on said input signal to yield a first complex signal;

generating a second complex signal represented by $e^{j\omega_i t}$, wherein the frequency generated is arbitrary frequency $\omega_i$;

multiplying said first complex signal by said second complex signal to yield a third complex signal; and taking the real component of said third complex signal to yield said real output signal.

11. The method according to claim 10, wherein said performing a real to analytic fast convolution comprises performing a positive frequency real to analytic fast convolution.

12. The method according to claim 10, wherein said performing a real to analytic fast convolution comprises performing a negative frequency real to analytic fast convolution.

13. The method according to claims 10, wherein said performing a real to analytic fast convolution comprises:

performing a first Fast Fourier Transformation (FFT) on said real input signal;

performing a second FFT on a set of Finite Impulse Response (FIR) coefficients;

multiplying the results of said second FFT element by element with the frequency response of an ideal real to analytic transform to form a first product;

multiplying the results of said first FFT element by element with said first product to yield a second product; and performing an Inverse Fast Fourier Transformation (IFFT) on the results of said second product to generate a complex output vector.

14. The method according to claims 10, wherein said performing a real to analytic fast convolution comprises:

performing a first Fast Fourier Transformation (FFT) on said real input signal;

performing a second FFT on a set of Finite Impulse Response (FIR) coefficients;

multiplying the results of said first FFT element by element with the frequency response of an ideal real to analytic transform to form a first product;

multiplying the results of said second FFT element by element with said first product to yield a second product; and performing an Inverse Fast Fourier Transformation (IFFT) on the results of said second product to generate a complex output vector.

* * * * *